United States Patent [19]

Sagara et al.

[11] 4,155,641

[45] May 22, 1979

[54] APPARATUS FOR SCANNING AN ORIGINAL IN A COPYING MACHINE

[75] Inventors: Seiji Sagara, Kawasaki; Hiroyuki Hattori, Inagi; Hirotoshi Kishi, Tokyo; Hiroshi Ogawa; Kazumi Umezawa, both of Kawasaki, all of Japan

[73] Assignee: Canon Kabushiki Kaisha, Tokyo, Japan

[21] Appl. No.: 866,842

[22] Filed: Jan. 4, 1978

[30] Foreign Application Priority Data

Jan. 11, 1977 [JP] Japan .................................. 52-1702

[51] Int. Cl.² .......................................... G03G 15/28
[52] U.S. Cl. ......................................... 355/8; 355/11
[58] Field of Search ........................ 355/8, 11, 66, 47

[56] References Cited

U.S. PATENT DOCUMENTS 3,884,574  5/1975  Doi et al. .............................. 355/8 X
4,073,584  2/1978  Kitajima ................................. 355/8

Primary Examiner—R. L. Moses
Attorney, Agent, or Firm—Fitzpatrick, Cella, Harper & Scinto

[57] ABSTRACT

Apparatus for scanning an original in a copying machine herein disclosed is of the type in which first and second mirrors are moved in the same direction at the velocity rate of 1:½. The apparatus comprises first and second carriages for supporting and carrying the first and second mirrors respectively, a guide rail for supporting the carriages movably in the direction of their movement and a particular arrangement of pulleys to move the mirrors. The arrangement comprises first and second movable pulleys provided on the second carriage and spaced from one another and first and second stationary pulleys. The first stationary pulley is positioned on the side of the second movable pulley relative to the first movable one whereas the second stationary pulley is positioned on the side of the first movable pulley relative to the second one. A wire extends over passing around these pulleys, with its one end being fastened to a stationary part of the apparatus after being passed around the first stationary pulley and then around the first movable pulley. The other end part turned back around the second stationary pulley extends to the second movable pulley where it turns back around the pulley and then its end is finally fastened to a stationary part of the apparatus. At the segment of the pulley wire extending between the first stationary pulley and the first movable pulley, the first carriage is fixedly connected with the wire so as to cause the first and second mirrors to move with the movement of the wire.

18 Claims, 4 Drawing Figures

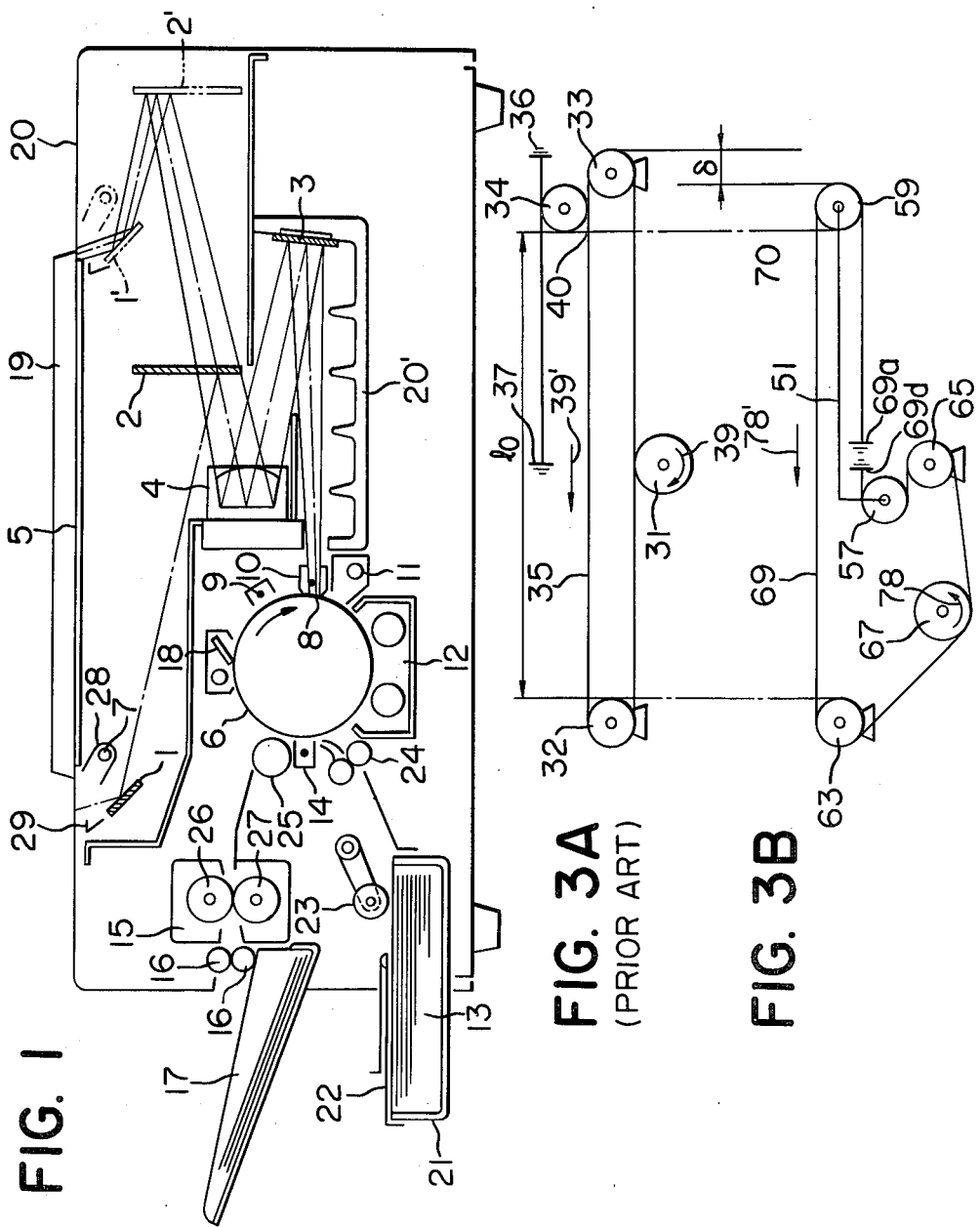

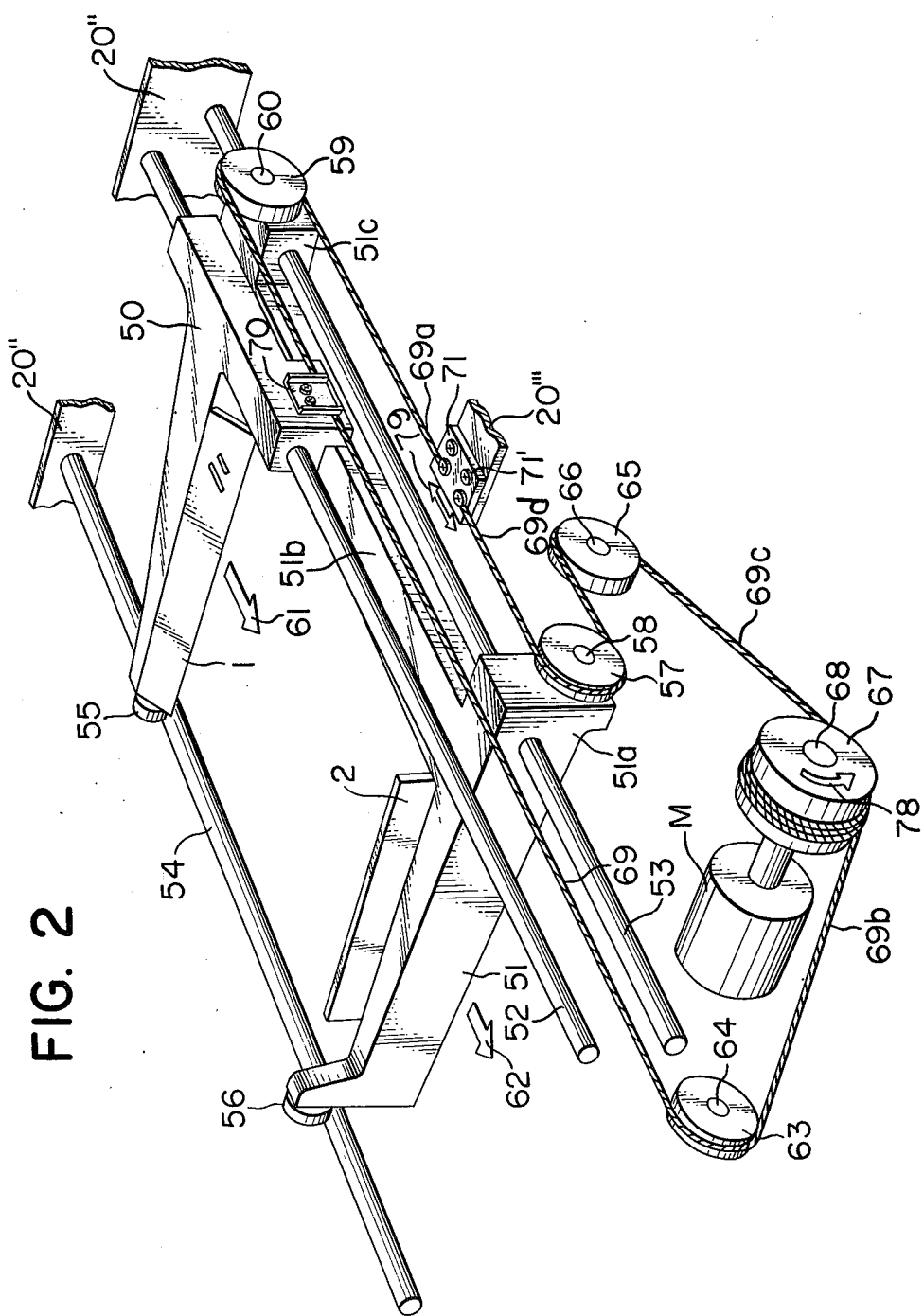

APPARATUS FOR SCANNING AN ORIGINAL IN A COPYING MACHINE

BACKGROUND OF THE INVENTION

Field of the Invention

The present invention relates to apparatus for scanning an original in a copying machine and more particularly to such type of scanning apparatus in which an original to be copied is scanned by first and second reflecting means driven to move in the same direction at the velocity ratio of 1:½ employing the principle of a running block.

The above mentioned type of apparatus, that is, the scanning apparatus adopted to scan originals to be copied in which the first and second reflecting means are moved in the same direction at the velocity ratio of 1:½ employing the principle of running block in order to keep the optical length between the original and the lens always constant, are well known, for example, from U.S. Pat. Nos. 3,330,181; 3,431,053; 3,614,222; 3,884,574; 3,914,044 and 3,832,057 and Japanese Patent Application laid open Nos. 75228/1973 and 60235/1975, Japanese Utility Model Application Publication No. 45332/1976 and Japanese Utility Model Application Publication No. 3297/1972.

These known apparatus have in common a construction wherein the movable carriage for the second reflecting means is provided with a block rotatably mounted thereon and with a wire laid round the block with one end of the wire being fastened to a stationary part of the associated copying apparatus. A portion of the wire is fixedly connected with the movable carriage for the first reflecting means. According to the arrangement, movement of the first reflecting means in a predetermined direction causes the wire to draw the block and thereby the second reflecting means is moved in the same direction as the first reflecting means and at a velocity of ½ that of the first one.

In the known apparatus disclosed in the above mentioned first five U.S. Patents specifications, there is used a spring to move the first and second reflecting means back to their respective home positions from their end positions of forward movement. One end of the spring is secured to the carriage of the second reflecting means and the other end to a stationary part of the copying apparatus. Thus, as the first and second reflecting means are moved forward to scan the original, a spring tension is stored in the spring. In other words, the forward movement of the reflecting means is carried out against the spring force. However, such arrangement of the apparatus has a particular disadvantage. Since the spring force is gradually increased with the forward movement of the first and second reflecting means, the mode of movement of the two reflecting means is apt to become unstable. This in turn causes an unstable scanning of the original. Another drawback is that in order to drive the first and second reflecting means to move against the spring force, there is required a motor of high power. This requirement will be enhanced when a spring of high elastic modulus is used so as to move back the first and second reflecting means more rapidly. Furthermore, the use of such a spring produces a greater impact when the first and second reflecting means are stopped at their home positions. This impact may cause a disorder of the scanning optical system and trouble with the associated copying machine.

Contrary to the above described known apparatus, the above mentioned U.S. Pat. No. 3,832,057 discloses a scanning apparatus in which a spring as described above is not used. But, this known apparatus is extremely complicated in structure. In order to move the first and second reflecting means forward at the velocity ratio of 1:½, this known apparatus employs a driving pulley for the first reflecting means and another driving pulley for the second one the diameter of which is ½ that of the first driving pulley. These two driving pulleys are coaxially mounted and have two separate wires, one for the first pulley and the other for the second pulley. The one wire wound around the first driving pulley is fastened to the carriage for the first reflecting means and the other wound around the second driving pulley is fastened to the carriage for the second reflecting means. In this manner, when the two pulleys are rotated by a motor, the first and second reflecting means are moved forwardly in the same direction and at the velocity ratio of 1:½. When the first driving pulley is reversed in its driving motion so as to pull the first reflecting means in the return direction, a third wire is brought into operation to pull a block provided rotatably on the carriage for the second reflecting means. The one end of the third wire is fastened to the carriage for the first reflecting means and the other end is fastened to a stationary part of the copying apparatus after passing around the above block. As will be understood from the above, in this known scanning apparatus, the principle of the running block is used in moving the first and second reflecting means back to their starting positions and therefore the structure is very complicated.

All of the apparatus disclosed in the above mentioned Japanese publications use no spring for returning the reflecting means back and use only one driving pulley so that the forward and backward movement of the first and second reflecting means may be effected using substantially only one pulley wire. The principle of this prior art arrangement is shown schematically in FIG. 3a for the purpose of reference.

Referring now to FIG. 3a, a driving pulley driven by a reversible motor is designated by 31 and a wire 35 is wound around the pulley with several windings. 32, 33 designate stationary blocks positioned in predetermined fixed positions within the copying apparatus. 34 is a running block rotatably mounted on a carriage for the second reflecting means. The one end of the wire 35 is fastened to a fixed position 36 and the other end to another fixed position 37 respectively within the copying apparatus. The wire extends from the position 37 to 36 passing around the running block 34, the stationary block 32, the driving pulley 31, the stationary blocks 33 and again the running block 34 successively in this order. The carriage for the first reflecting means is connected with the wire at its segment 40 extending between the blocks 32 and 34. A rotation of the driving pulley in the direction of arrow 39 will drive the carriage of the first reflecting means connected with the wire 35 as well as the carriage of the second reflecting means having the running block 34 mounted thereon in the direction of arrow 39' at the velocity ratio of 1:½ to scan an original. At this time point, the segment of the wire 35 extending on the side of the stationary block 33 pulls the running block 34 for the forward movement. After the completion of a scanning of the original, the first and second reflecting means can be moved in the opposite direction to the arrow 39' at the velocity ratio of 1:½ by reversing the rotation of the driving pulley.

During this phase of operation, the wire 35 pulls the running block 34 by its segment extending on the side of the stationary block 32. The range in which the connection point of the carriage of the first reflecting means with the wire 35 is allowed to move, is indicated by lo.

While the known original scanning apparatus illustrated in FIG. 3a does not have those disadvantages as the previously described known apparatus have, it has other drawbacks. One drawback is that the apparatus becomes relatively long in size in the direction of movement of the running block 34. This is because the running block 34 must be moved between the stationary blocks 32 and 33 together with the connecting point 40 of the carriage of the first reflecting means with the wire 35. Moreover, the stationary block 33 has to be positioned at least beyond the end of the path of movement of the running block 34. This constitutes a limitation to the arrangement of apparatus. A further drawback involved in this known apparatus is that since the wire 35 must be a long one, it easily becomes slack over a period of time.

SUMMARY OF THE INVENTION

Accordingly, it is the principal object of the invention to provide a scanning apparatus which permits a stable scanning of original.

It is another object of the invention to provide a scanning apparatus which permits a stable scanning of an original and which is small in size.

It is a further object of the invention to provide a scanning apparatus which makes it possible to scan an original in a stable manner and which is simple in structure.

Another object of the invention is to provide a scanning apparatus which permits the scanning of an original in a stable manner and which is also small in size and simple in structure.

Still a further object of the invention is to provide a scanning apparatus which provides for the return of the first and second reflecting means back to their starting positions without the use of a spring.

An even further object of the invention is to provide a scanning apparatus of the above mentioned type which is small in size and in which essentially only a single wire is used to move the first and second reflecting means forward and backward.

An additional object of the invention is to provide an original scanning apparatus of the above mentioned type in which essentially only a single wire is used to move the first and second reflecting means forward and backward and which has a relatively high degree of freedom as to the selection of the position where the stationary pulley is to be disposed.

To attain these objects according to the present invention, there is provided an original scanning apparatus as described in detail hereinafter.

The apparatus according to the invention includes a first reflecting means optically opposed to an original table and a second reflecting means optically opposed to the first reflecting means and also to a lens for projecting the image of an original onto a photosensitive body. The first and second reflecting means are fixed to first and second movable carriages respectively. On the second movable carriage, there are mounted first and second running blocks or movable pulley spaced from each other in the direction of movement of the second carriage. The apparatus further includes at least two stationary blocks or pulley arranged with a distance between them in the moving direction of the first and second reflecting means. The first stationary pulley is disposed in a predetermined position on the side opposite to the second movable pulley relative to the first movable pulley whereas the second stationary pulley is disposed in a predetermined position on the side of the second movable pulley as the second movable pulley. Between the first stationary pulley and the first movable pulley, there spans a segment of an essentially single wire-like member, which segment extends in parallel with the original table. At that segment, the first movable carriage is connected with the wire-like member. The wire-like member is hung around the first stationary pulley turning its direction and is then led to the second stationary pulley around which the member is hung. After turning the direction at the second stationary pulley, the wire-like member is led to the second movable pulley around which the member is hung turning its direction and then led to a stationary part of the copying apparatus where it is fastened. On the other hand, the wire-like member coming from the first stationary pulley and passing around the first movable pulley is fastened to a stationary part of the copying apparatus after turning its direction at the first movable pulley.

The first stationary pulley is positioned at an outward position beyond the end of movement of the connecting part between the first movable carriage and the wire-like member in the direction away from the first movable pulley. The second stationary pulley is positioned at an outward position beyond the end of movement of the second movable pulley in the direction toward the second stationary pulley. The above mentioned essentially single wire-like member is wound around a driving block with its segment other than the segments extending between the first movable pulley and the one end fastened to the stationary part and between the second movable pulley and the other end fastened to the stationary part of the copying machine. Either one or both of the first and second stationary pulleys may be used as driving pulleys.

For the purpose of this specification, the term "wire-like member" means an elongate flexible body capable of transmitting driving power such as metal wire, plastic cord, single filament of metal, plastics and the like, belt and chain. Also, the terms "block" and "pulley" mean such a member along a portion of whose circumference the above defined elongate flexible body is hung around or around whose circumference the body is wound forming one or more windings and which is able to be rotated under above said condition to convey the flexible elongate body.

Other and further objects, features and advantages of the invention will appear more fully from the following description.

BRIEF DESCRIPTION OF THE DRAWINGS

FIG. 1 is a schematic and explanatory view of an example of an electrophotographic copying apparatus to which the original scanning apparatus according to the invention is applicable;

FIG. 2 is a perspective view of the essential part of the original scanning apparatus showing one embodiment of the invention;

FIG. 3a is an explanatory view of the original scanning apparatus according to the prior art; and FIG. 3b shows the embodiment of FIG. 2 in a simplified form similar to FIG. 3a.

DESCRIPTION OF THE PREFERRED EMBODIMENTS

Referring now to FIG. 1, there is shown an electrophotographic copying machine. An original to be copied is laid on an original table 5 made of transparent glass and a copy button is pushed down. Now, a photosensitive drum 6 starts rotating in the direction of the arrow i.e. clockwise. When the photosensitive drum has rotated an amount sufficient to define a predetermined angle of rotation, a start signal for exposure is issued from a controlling means not shown. Then, an illuminating lamp 7 and a first mirror 1 start moving forward, that is, to the right as viewed in the drawing, parallel to the original table 5 and at the same speed as the peripheral speed of the photosensitive drum 6. At the same time, a second mirror 2 starts moving also to the right as viewed in the drawing, parallel to the original table but at the speed of ½ that of the first mirror. During this forward movement of the first and second mirrors, the image of an original illuminated by the lamp 7 from under the table is focused on the drum 6 at the exposure part 8 through the optical system composed of the first and second mirrors 1 and 2, an inmirror lens 4 and a third mirror 3. More particularly, the first mirror 1 moves optically in opposition to the original table 5 and the second mirror 2, and reflects the light coming from the original toward the second mirror 2. The second mirror 2 moves optically in opposition to the first mirror 1 and the inmirror lens 4, and reflects the light from the first mirror toward the lens 4. The focussing beam reflected by the inmirror lens 4 is directed to the third mirror 3 which reflects the beam onto the drum 6 at the exposure part 8.

The original table 5, inmirror lens 4 and third mirror 3 are fixed to a stationary part of the machine body of the copying apparatus such as wall plate 20 or light shielding member 20'. Therefore, members 5, 4 and 3 are stationarily mounted at fixed positions respectively.

When the first and second mirrors 1 and 2 reach the positions 1' and 2' suggested by phantom lines respectively, the optical scanning of the original comes to an end and therefore the imagewise exposure to the photosensitive drum is completed. Then, the mirrors 1 and 2 detect their end positions and stop their forward movement. Immediately after stopping their movement to the right, the mirrors 1 and 2 reverse their motion and start returning to their starting positions, that is, their home positions indicated by the solid lines. During the backward movement of the mirrors 1 and 2, the lamp 7 is turned off.

The photosensitive drum 6 has a photosensitive medium comprising a lamination composed of an electrically conductive layer, a photoconductive layer of CdS or the like, and a transparent insulating layer. The photosensitive drum 6 is initially charged positively by a positive charger 9. When it reaches the exposure area 8, the photosensitive drum is subjected to a slit exposure of the original image and simultaneously subjected to an AC charging (charge removing) by an AC charger 10 which has an optical slit for transmitting the above mentioned focusing beam. Thereafter, the whole surface of the photosensitive medium is exposed uniformly to the light of a whole surface exposure lamp 11 so that an electrostatic latent image is formed on the surface of the drum 6. As the drum rotates, the latent image reaches the developing station and it is developed by a developing device 12 and visualized. After developing, a transfer sheet 13 is supplied to the drum from a sheet feeding part. The transfer sheet 13 is brought into close contact with the surface of drum 6 and the developed image on the drum is transferred to the transfer sheet 13 using a transferring charger 14. The transfer sheet carrying the developed image thereon is separated from the drum 6 by a roller 25 and transported to a fixing device 15 by which the developed image on the sheet 6 is fixed. After fixing, the sheet is received into a tray 17 through a sheet delivery roller 16.

A cleaning blade 18 cleans off any remaining toner from the surface of the drum with which the edge of the cleaning blade is in press-contact, so as to make the photosensitive drum 6 ready for the next cycle of copying.

In the drawing of FIG. 1, the reference numeral 19 designates a plate by which the original is pressed onto the original table, 20 is an outer wall plate, 20' is a castings for shielding light on which the third mirror 3 and inmirror lens 4 are mounted as mentioned previously. 21 is a cassette for retaining transfer sheets, 22 is a cover of the cassette, 23 is a sheet feeding roller, 24 is a register roller, 25 is a sheet separating roller, 26, 27 are heating rollers, 28 is a reflection mirror and 29 is a sub-reflection mirror. The reflection mirror 28 is used to collect the light emitted from the lamp onto the original surface whereas the sub-reflection mirror 29 is used to reflect a portion of the light emitted from the lamp 7 toward the original surface. Both the reflection mirrors 28 and 29 have together with the lamp 7 and the first mirror 1 respectively as unitary parts thereof.

As will be understood from the above, the original scanning optical system used for slit exposure in a copying machine as described above necessitates such apparatus which can move the first and second mirrors 1 and 2 accurately at the velocity ratio of 1:½.

Referring now to FIG. 2, the reference numeral 50 designates a first supporting member (carriage) by which the first mirror 1, lamp 7 and reflectors 28, 29 are supported and carried with a certain angle of inclination to the horizontal as required. The second mirror 2 is supported vertically by a second supporting member (carriage) 51. To carry and guide the supporting members 50 and 51, three parallel guide rods 52, 53 and 54 extend at either sides of the first and second mirrors 1 and 2 and along the moving path thereof. These guide rods 52, 53 and 54 are fixed stationarily to a stationary part of the machine body such as a beam 20" of the copying machine in parallel with the original table 5. The guide rod 52 passes through the one end of the first supporting member 50 in a manner that it may slide along the rod 52. At the other end, the first supporting member 50 has a roller 55 that rolls on the guide rod 54. In a similar manner, the guide 53 passes through the end portions 51a and 51c of the second supporting member 51 at one side thereof. The end portion 51c is formed as an angled projection of the arm 51b of the second supporting member. At the other side, the second supporting member 51 also has a roller 56 that rolls on the guide rod 54. The guide rod 52 is longer than the length of the moving path of the supporting member 50 on its rod fitting side. The rod 53 is longer than the length of the moving path of the second supporting member 51 on its rod fitting side. The rod 54 is longer than the range in which the rollers 55 and 56 move forward and backward. The shape of each of the supporting members and means for movably supporting these supporting members are not limited to those illustrated in the drawing.

Any modification and change may be made as desired without departing from the scope of the invention.

On the end portion 51a of the second supporting member 51, there is provided a fixed axle 58 on which a second movable pulley 57 is mounted. Also, on the angled projection 51c there is provided a fixed axle 60 on which a first movable pulley 59 is mounted. Therefore, it will be seen that the two movable pulleys 57 and 59 are disposed on the same member, that is, the second supporting member 51 but spaced from each other in the direction of movement of the member 51.

At a predetermined position leftward (as viewed in the drawing) distant from the guide rods 52 and 53, there is provided a first stationary pulley 63 which is rotatably mounted on a fixed axle 64. The first stationary pulley 63 is positioned at such a position that it lies on the left hand side beyond the range of movement of the first supporting member 50 (more particularly its connecting portion with a wire 69 hereinafter described) and where no mechanical interference may occur between the pulley 63 and the movement of the second supporting member 51 and/or the movable pulley 57. The range of movement of the first supporting member 50 is determined at the time of design in accordance with the maximum size of the original in length to be scanned by the mirrors of the copying machine.

A second stationary pulley 65 is mounted on a fixed axle 66 in a similar manner to that for the first stationary pulley, but at a right hand position beyond the range of movement of the second movable pulley 57.

In other words, the first stationary pulley 63 is fixed at a position beyond the end point of movement of the connecting portion of the member 50 with the wire 69 toward the pulley 63 (forward movement in the drawing). The second stationary pulley 65 is fixed at a position beyond the end point of movement of the pulley 57 toward the pulley 65 (backward movement in the drawing) and closer to the pulley 63 than the end point of movement of the first movable pulley 59 in the direction away from the pulley 63.

At an intermediate position between the first and second stationary pulleys 63 and 65 and at a position lower than them, there is provided a driving pulley 67 which is mounted on a driving shaft 68. The driving shaft 68 is disposed at a fixed position within the apparatus and driven to rotate by an electric motor M which is reversible through a suitable controlling means (not shown).

The reference numeral 69 designates a driving wire, one end 69a of which is fastened to a wire fixing plate 71. The wire 69 is turned around the first movable pulley 59 toward the first stationary pulley 63 around which the wire is again turned back toward the driving pulley 67. The wire is wound several times on the driving pulley to prevent slippage. Thereafter, the wire is directed to the second stationary pulley 65 around which the wire is turned to the second movable pulley 57. After turning around the pulley 57, the other end 69d is fastened to the same wire fixing plate 71 as the one end 69a. Furthermore, a portion of the wire is fixed to the first supporting member 50 by a mounting plate 70 between the first movable pulley 59 and the first stationary pulley 63. Segments of the wire 69 extending between the pulleys 59 and 63, between the pulley 59 and the plate 70, between the pulley 57 and the plate 70 and between the pulleys 57 and 65 are all in parallel with the guide rods 52, 53 and 54 and therefore with the moving path of the first and second mirrors 1 and 2 and also with the original table 5.

The wire fixing plate 71 to which the two ends of the wire are fastened is fixed at a predetermined position on a stationary part of the machine body such as a beam 20''' of the copying machine. This means that both ends of the wire are fixed to the stationary part of the machine body through the fixing plate 71. It is not always necessary that the driving wire 69 be a single wire. Instead, two separate wires also may be used for this purpose. In this case, one wire will extend from 69a to the first supporting member 50 and the other will extends from 69d to the member 50. Therefore, one end of each the wire is fastened to the member 50 and the other end to the fixing plate 71. In this case, while two separate wires are used, they are equivalent to a single wire connected to member 50. Therefore, this case may be considered as use of a substantially single wire.

In scanning an original for slit exposure on the photosensitive drum, the motor M drives the driving pulley 67 to rotate in the direction of arrow 78 at a constant speed. The segment 69b of the wire is wound up by the driving pulley 67 by a certain length and the segment 69c is drawn out by the same length. Accordingly, the first support member 50 is drawn by the wire segment 69b in the direction of arrow 61 and moves at the speed at which the driving pulley 67 winds up the wire (this speed is the product of the peripheral speed of the drum 6 and the reciprocal of copy mangification). As the movable pulley 59 on the second supporting member 51 is drawn by the wire 69, the second member 51 moves in the direction of arrow 62, that is, the same direction as that of the arrow 61, according to the principle of running block, at the speed of ½ of the first member 50. On the other hand, the wire segment 69c drawn out from the driving pulley 67 is hauled in, without forming any slack, owing to the movement of the second movable pulley 57 moving together with the second supporting member 51. As a result, the optical system driving wire 59 transmits its driving power accurately to the first and second supporting members 50 and 51 and there is no fear of forming any slack in the wire when the two members 50 and 51 are moving at the velocity ratio of 2:1.

When the first and second mirrors 1 and 2 reach the end points of their forward movement at the velocity ratio of 2:1 and a scanning of original is completed, the motor M is reversed in rotation and now the driving pulley 67 rotates in the opposite direction to the arrow 78. Thereby the wire segment 69c is drawn up on the pulley 67 by a certain length and the wire segment 69b is drawn out by the same length. Thus, the wire segment 69c draws the pulley 57 so as to return the second supporting member 51 to its home position (solid line position in the drawing). The velocity of this backward movement is ½ of the velocity at which the wire segment 69c is drawn up by the pulley 67. On the other hand, the wire segment 69b drawn out as a result of the reversed rotation of the pulley 67 is hauled in by the second movable pulley 59 moving together with the second supporting member 51 in the same direction so as not to form any slack in the wire. Therefore, the first supporting member 50 is drawn by the wire 69 and it now moves returning to its home position indicated by the solid line. The speed of this backward movement of the first member 50 is equal to the speed at which the driving pulley draws out the wire segment 69b. Thus, the first and second mirrors 1 and 2 move again at the velocity ratio of 2:1 during this backward movement. Also, in this backward movement, the essentially single wire 69 which forms a loop through the plate 71 never becomes slack and in the same manner as in forward movement, the driving power of the driving pulley 67 is transmitted to the first and second supporting members 50 and 51 accurately and in a stable manner.

When the first and second mirrors 1 and 2 and therefore the first and second supporting mirrors 50 and 51 reach their home positions, the motor M stops rotating. When it is desired to make a number of copies continuously, the above described forward- and backward motion cycle is repeated as desired.

With the scanning apparatus shown in FIG. 2, it is also possible to use the positions indicated by the solid lines in FIG. 2 as end points of forward movements for scanning with the first and second mirrors 1 and 2 and therefore the first and second supporting members 50 and 51. In this case, the arrows 61 and 62 will indicate the direction of backward movement to the home positions of the first and second mirrors 1 and 2 respectively and the arrow 78 is to be considered as indication of the direction of rotation of the driving pulley 67 for this backward movement. Also, the home positions for the first and second mirrors and therefore for the first and second supporting members 50 and 51 are to be positioned as previously mentioned in such positions distant from the respective solid line positions on the drawing of FIG. 2 by the distance corresponding to the respective ranges of movement of the first and second mirrors 1 and 2 along the guide rods 52, 53 and 54. The range of movement of each mirror is, as already mentioned above, determined in accordance with the maximum length of the original allowed to be copied by the associated copying machine. As a matter of course, the pulley 63 is to be positioned in an outward position distant from the wire connecting portion of the first supporting member 50 in its home position and the pulley 65 is to be positioned in an outward position distant from the end point position of forward movement of the pulley 57. When the first and second mirrors 1 and 2 move forward to scan the original for effecting a slit exposure of the original image for the photosensitive drum, the driving pulley 67 rotates in the opposite direction to the arrow 78.

In assembling the copying apparatus or when it is required, adjustments are made as to the relative position between the mirrors 1 and 2 and the original table 5 and the optical length from the original table to the lens 4. These adjustments may be carried out by adjusting the wire fixing position at which the wire 69 is fixed to the first supporting member 50 by means of the plate 70 or be adjusting the wire end fixing position at which the plate 71 having both ends of the essentially single wire 59 fastened thereto is fixed to a stationary part 20''' of the machine body, as suggested by a double arrow 79. For an adjustment employing the latter mentioned measure, the bolt hole bored in the stationary member 20''' for a bolt 71' may be formed as an elongate slot elongated in the direction of arrow 79. The bolt 71' adjustably passes through the slot to fasten the plate 71 to the stationary member 20'''.

In the above described embodiment, the movement range of the second movable pulley 57 is provided between the first and second stationary pulleys 63 and 65. However, it is possible to move the pulley 57 farther in the left hand direction as viewed in the drawing of FIG. 2 beyond the first stationary pulley 63 so long as the size of the copying machine allows it. In this case, the distance between the first stationary pulley 63 and the second stationary pulley 65 may be shortened to any extent as required and if desired the stationary pulleys 63 and 65 may be replaced by a single pulley. If the motor M is used to drive either of the stationary pulleys 63 and 65, then the driving pulley will become unnecessary. Also, it is possible to dispose the driving pulley 67 in such a manner that between the pulleys 59 and 63 or between the pulleys 57 and 65, the wire 69 may be wound up on the driving pulley 67. Instead of wire there may also be used a belt, chain and the like. When using a belt, pulleys in a shape of a drum are to be used. When using a chain, the pulleys shown in the embodiment are to be replaced by sprockets respectively.

FIG. 3b shows the embodiment of FIG. 2 in an extremely simplified form for the sake of comparison with the prior art apparatus shown in FIG. 3a.

Provided that the distance over which the first supporting member moves is lo for the cases of FIGS. 3a and 3b, it will be seen from the drawing that the arrangement of FIG. 3b allows for a reduction in the size of the optical system driving apparatus by an amount $\delta$ that is approximately equal to the size of one stationary pulley and accordingly to shorten the length of the wire, compared with that of FIG. 3b according to the prior art. This difference is attributable to the fact that in the prior art arrangement of FIG. 3a, the stationary pulleys 32 and 33 are disposed with a larger distance therebetween than the length of movement range given for the first supporting member and the movable pulley 34 whereas in the arrange of FIG. 3b according to the invention, the stationary pulleys 63 and 65 are disposed with a smaller distance therebetween than the length of movement range given for the first and second supporting members 50 and 51. Moreover, in the prior art system, the stationary pulley 33 is positioned outside of the movement range of the first supporting member and the movable pulley 34 and therefore there results a limitation as to the selection of a mounting position the pulley 33 considering the size of a given copying machine. In contrast with the prior art, for the apparatus of FIG. 3b there is no substantial limitation as to the selection of a mounting position for the stationary pulley 65 corresponding to the pulley 33 in the prior art system. The pulley 65 may be positioned in any place between the movable pulleys 57 and 59 in vertical positions shown in FIG. 3b. Also, as to the position as viewed in the drawing, the stationary pulley 65 may be positioned at any desired position only with some change in position of its fixed end 69d and of the movable pulley 57.

In the above embodiment, such apparatus is particularly shown and described in which two mirrors are moved to effect scanning of an original to be copied. However, the present invention is also applicable to another apparatus in which three or more mirrors are moved for scanning. For this type of apparatus, either one or both of the first and second supporting members support and carry those plural mirrors. As a modification, there may be provided a mirror for deflecting the optical path or other means between the second reflecting means and lens. Also, the stationary original table shown in the drawing may be replaced by a movable original table so as to speed up the scanning of the original and/or to reduce the length the path of movement of the first and second reflecting means. In this case, the movable original table is moved simultaneously with the movement of the reflecting means, but in the opposite direction to the latter.

The original scanning apparatus according to the invention is also applicable to a transferring type copying machine in which an electrophotographic photosensitive medium is provided on an endless belt of good flexibility and the endless belt is rotated between plural rollers. The apparatus for scanning an original according to the invention is also useful for a so-called electrofax type of copying machine in which photosensitive paper is used instead of transfer paper.

What we claim is:

1. Apparatus for scanning an original to be copied, which comprises;
   an original table for supporting an original to be copied;
   a first reflecting means optically opposed to said original table;
   a second reflecting means optically opposed to said first reflecting means and to a lens system for focusing an original image onto a photosensitive medium;
   a first carriage for carrying said first reflecting means;
   a second carriage for carrying said second reflecting means;
   guide means for supporting and guiding said first and second carriages for reciprocal movement in parallel with said original table;
   first and second movable pulleys disposed on said second carriage and spaced from each other in the direction of movement of said second carriage;
   a first stationary pulley disposed at a predetermined position such that said first stationary pulley and said first movable pulley are disposed on opposite sides of said second movable pulley;
   a second stationary pulley disposed at a predetermined position such that said second stationary pulley and said first stationary pulley are disposed on opposite sides of said second movable pulley;
   an essentially single wire-like member extending around said first movable pulley, first stationary pulley, second stationary pulley and second movable pulley successively, said wire-like member being connected with said first carriage at a position between said first movable pulley and said first stationary pulley; and
   a driving means for providing driving power to said essentially single wire-like member.

2. An original scanning apparatus as claimed in claim 1, wherein said driving means comprises a reversible driving pulley and wherein a portion of said essentially single wire-like member is wound around said driving pulley in such a manner as to prevent slippage.

3. An original scanning apparatus as claimed in claim 2, wherein said wire-like member is wound around said driving pulley at a position between said first and second stationary pulleys.

4. An original scanning apparatus as claimed in claim 2, wherein either one of said first and second stationary pulleys also serves as said driving pulley.

5. An original scanning apparatus as claimed in claim 1, wherein said wire-like member extends in parallel with said original table at a position between said first stationary pulley and said first movable pulley.

6. An original scanning apparatus as claimed in claim 1, wherein said essentially single wire-like member is fixed in predetermined positions at its two end portions respectively, of which one end portion is a portion turned around said first movable pulley after passing around said first stationary pulley and the other end is a portion turned around said second movable pulley after passing around said second stationary pulley.

7. An original scanning apparatus as claimed in claim 1, wherein said first stationary pulley is positioned beyond the end point of movement of the connecting part of the first carriage with the wire-like member in a direction toward said first stationary pulley and wherein said second stationary pulley is positioned beyond the end point of movement of the second movable pulley in a direction toward said second stationary pulley.

8. An original scanning apparatus as claimed in claim 7, wherein said second stationary pulley is disposed at a position closer to the first stationary pulley than the end point of movement of the first movable pulley in a direction away from the first stationary pulley.

9. An original scanning apparatus as claimed in claim 1, wherein the length of movement range for the first carriage is longer than the distance between the first and second stationary pulleys in the direction of movement of said first carriage.

10. An original scanning apparatus as claimed in claim 1, wherein the length of movement range for the first carriage and that for the second carriage are longer than the distance between said first and second carriages in the direction of movement of said first and second carriages.

11. A copying apparatus of the type in which in forming a copy image an original is optically scanned, which comprises:
    a movable photosensitive body;
    an original table for supporting an original to be copied;
    a lens system for projecting the original image onto the photosensitive body;
    a light source for illuminating the original;
    a first reflecting means optically opposed to the original table;
    a second reflecting means optically opposed to the first reflecting means and to the lens system;
    a first carriage for carrying the first reflecting means and the light source;
    a second carriage for carrying the second reflecting means;
    guide means for supporting and guiding said first and second carriages for reciprocal movement in parallel with the original table;
    first and second movable pulleys disposed on the second carriage and spaced from each other in the direction of movement of said second carriage;
    a first stationary pulley disposed at a predetermined position such that said first stationary pulley and said first movable pulley are disposed on opposite sides of said second movable pulley;
    a second stationary pulley disposed at a predetermined position such that said second stationary pulley and said first stationary pulley are disposed on opposite sides of said second movable pulley;
    an essentially single wire-like member extending between its one end fastened to a stationary member and its other end fastened to a stationary member while passing and turning back around the first movable pulley, the first stationary pulley, the second stationary pulley and the second movable pulley successively, those segments of said wire-like member extending between the one end and the first movable pulley, between the first movable pulley and the first stationary pulley, between the second stationary pulley and the second movable pulley and between the second movable pulley and the other end being all in parallel with the original table and said wire-like member being connected with the first carriage at the segment extending between the first movable and the first stationary pulley; and driving means for providing driving power to the essentially single wire-like member.

12. A copying apparatus as claimed in claim 11, wherein said driving means comprises a reversible driving pulley and wherein a portion of said essentially single wire-like member is wound round said driving pulley in such manner as to prevent slippage.

13. A copying apparatus as claimed in claim 12, wherein said wire-like member is wound around said driving pulley at the segment extending between the first and second stationary pulleys.

14. A copying apparatus as claimed in claim 12, wherein either one of the first and second stationary pulleys serves as said driving pulley.

15. A copying apparatus as claimed in claim 11, wherein said first stationary pulley is positioned beyond the end point of movement of the connecting part of the first carriage with the wire-like member in a direction toward said first stationary pulley and said second stationary pulley is positioned beyond the end point of movement of the second movable pulley in a direction toward said second stationary pulley.

16. A copying apparatus as claimed in claim 15, wherein said second stationary pulley is disposed at a position closer to the first stationary pulley than the end point of movement of the first movable pulley in a direction away from the first stationary pulley.

17. A copying apparatus as claimed in claim 11, wherein the length of movement range for the first carriage is longer than the distance between the first and second stationary pulleys in the direction of movement of said first carriage.

18. A copying apparatus as claimed in claim 11, the length of movement range for the first carriage and that for the second carriage are longer than the distance between said carriages in the direction of movement thereof.

* * * * *

UNITED STATES PATENT OFFICE
CERTIFICATE OF CORRECTION

Patent No. 4,155,641　　　　　　　　　Dated　May 22, 1979

Inventor(s)　　　SEIJI SAGARA, ET AL.

It is certified that error appears in the above-identified patent and that said Letters Patent are hereby corrected as shown below:

Column 6, line 30, "have" should read --move--;

Column 9, line 9, "mirrors" should read --members--;

Column 10, line 47, delete "vertical" before "positions";

Column 10, line 48, insert --vertical-- before "position";

Column 13, line 15, "round" should read --around--.

Signed and Sealed this

Sixth　Day of　November 1979

[SEAL]

*Attest:*

RUTH C. MASON
*Attesting Officer*

LUTRELLE F. PARKER
*Acting Commissioner of Patents and Trademarks*